W. H. RUDOLPH.
Spreading Saw Teeth.

No. 107,963. Patented Oct. 4, 1870.

WITNESSES
L. S. Mabee
Alex. F. Roberts

INVENTOR.
W. H. Rudolph
Per Munn & Co
ATTORNEYS.

United States Patent Office.

WILLIAM H. RUDOLPH, OF CLARKSVILLE, TENNESSEE.

Letters Patent No. 107,963, dated October 4, 1870.

IMPROVEMENT IN DEVICES FOR SPREADING CIRCULAR-SAW TEETH.

The Schedule referred to in these Letters Patent and making part of the same

*To all whom it may concern:*

Be it known that I, WILLIAM H. RUDOLPH, of Clarksville, in the county of Montgomery and State of Tennessee, have invented a new and useful Improvement in Device for Spreading Circular-saw Teeth; and I do hereby declare that the following is a full, clear, and exact description thereof, which will enable others skilled in the art to make and use the same, reference being had to the accompanying drawing forming part of this specification.

The object of this invention is to facilitate the operation of spreading or expanding the points of circular-saw teeth, so as to give a sharp cutting-edge to the teeth, and relieve the saw of friction; and It consists in a metallic plate, provided with projecting ears for holding the tooth to be spread, and for holding the plate on the saw, the whole constructed and operating as hereinafter more fully described In the accompanying drawing—

Similar letters of reference indicate corresponding parts.

A represents the plate, which may be made of cast or wrought metal, with ears attached to the sides thereof, between which ears the saw-teeth are placed, when the points are spread.

Figure 1:
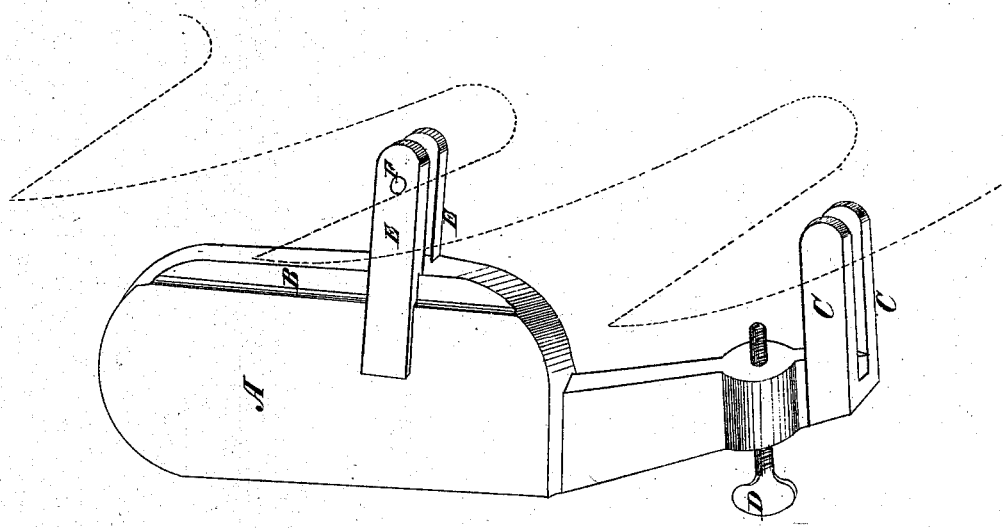
Figure 1 represents a perspective view of the plate, with the parts attached thereto applied to the saw.
Figure 2:
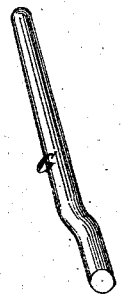
Figure 2 is a view of a punch, which is used for spreading the teeth.

B is a plate of steel, which is firmly attached to the plate A by screws or otherwise, which serves as an anvil in spreading the teeth. The mode of applying the plate is seen in fig. 1.

C represents the rear ears, which serve for holding the plate in position on the saw.

D is a gauge-screw, by which the distance which the ears lap onto the teeth of the saw are governed.

E represents the forward ears, which may be in any convenient form, the outer ends of which are connected by a pin, F.

The tooth to be spread is passed through the space between this pin and the steel plate B, as seen in the drawing, the position of the point of the tooth on the steel plate being governed by the gauge-screw D.

The space between the ears C is designed to be just wide enough to admit the saw at or near the base of the tooth, and the space between the front ears E admits the point of the tooth.

When the point of the tooth is placed on the steel anvil, as seen in fig. 1, it is spread by a blow on a steel punch.

G is the punch. The punch is necessarily a little crooked, to allow its end to sit squarely on the tooth. A smart blow with a hammer on the punch spreads or expands the point laterally in each direction. The little lips, thus formed on each side of each of the points serve, instead of the ordinary set of the saw, to give the saw clearance, and allow it to run without friction, and also to shave the side of the lumber sawed, and make it smooth and merchantable. The cutting-points of the teeth are thus made thin and sharp, so that a good cutting-edge is preserved for a much longer period than by the ordinary filing.

Having thus described my invention,

I claim as new and desire to secure by Letters Patent—

The plate A, with the anvil B, ears C C and E E, pin F, and gauge-screw D, when applied to a saw, substantially as and for the purposes herein shown and described.

WILLIAM H. RUDOLPH.

Witnesses:
  R. S. MOORE,
  JAS. E. BROWNING.